(12) United States Patent
Piccinali

(10) Patent No.: US 8,671,797 B2
(45) Date of Patent: Mar. 18, 2014

(54) DEVICE FOR AUTOMATIC ADJUSTMENT OF TENSION APPLIED TO A CONTROL CABLE

(75) Inventor: Eugenio Piccinali, Castelletto Sopra Ticino (IT)

(73) Assignee: Meccanica Finnord S.p.A., Luino (VA) (IT)

( * ) Notice: Subject to any disclaimer, the term of this patent is extended or adjusted under 35 U.S.C. 154(b) by 95 days.

(21) Appl. No.: 12/908,278

(22) Filed: Oct. 20, 2010

(65) Prior Publication Data

US 2011/0100149 A1 May 5, 2011

(30) Foreign Application Priority Data

Oct. 29, 2009 (IT) .............................. MI2009A1888

(51) Int. Cl.
*F16C 1/22* (2006.01)
*F16C 1/26* (2006.01)

(52) U.S. Cl.
USPC .................................... 74/501.5 R; 74/502.4

(58) Field of Classification Search
USPC ........... 74/501.5 R, 502, 502.3–502.6, 500.5; 188/71.7, 71.8, 196 R, 196 P, 196 V; 192/111.11, 111.12; 403/359.1–359.6, 403/383
See application file for complete search history.

(56) References Cited

U.S. PATENT DOCUMENTS

| | | | |
|---|---|---|---|
| 2,957,354 A | | 10/1960 | Morrow |
| 4,141,117 A | * | 2/1979 | Van Gompel ............... 24/136 R |
| 4,420,988 A | * | 12/1983 | Deligny ................... 74/501.5 R |
| 4,549,709 A | * | 10/1985 | Deligny .......................... 248/56 |
| 5,467,619 A | * | 11/1995 | Stillwagon et al. ............... 70/34 |
| 6,093,892 A | * | 7/2000 | Arimoto ..................... 174/84 R |

FOREIGN PATENT DOCUMENTS

| | | |
|---|---|---|
| DE | 3830672 A1 | 3/1990 |
| EP | 0183589 A1 | 6/1986 |
| EP | 0183589 B1 | 11/1988 |
| FR | 2658878 A1 | 8/1991 |
| FR | 2658878 B1 | 4/1992 |

* cited by examiner

*Primary Examiner* — James Pilkington
*Assistant Examiner* — Richard Urbanski
(74) *Attorney, Agent, or Firm* — Notaro, Michalos & Zaccaria P.C.

(57) ABSTRACT

Device for automatic adjustment of tension applied to a control cable has a container element, a first sliding element sliding in the container element, a second sliding element sliding in the first sliding element and connected to a duct of a control cable. A sphere for constraining the translation of the sliding elements is in the container, housed in a seating formed in the first sliding element and having at least one lower portion in contact with the second sliding element and at least one upper portion that can contact the container, there being also provided a first operating on the first sliding element and a second helical spring operating on the second sliding element.

12 Claims, 5 Drawing Sheets

DEVICE FOR AUTOMATIC ADJUSTMENT OF TENSION APPLIED TO A CONTROL CABLE

The present invention relates to a device for automatic adjustment of tension applied to a control cable, more particularly a tension adjusting device that can automatically eliminate any loosening or slack occurring in a control cable and automatically restore proper tension.

Such loosening may occur, for instance, due to permanent elongation of the wire or due to a change in the size of the devices to be controlled such as clutch units or the like.

Control cables are widely used for remote control of equipment. These cables substantially include a flexible conduit and a flexible inner wire, e.g. consisting of a wire strand, that can slide within the conduit.

One end of the inner wire is connected, for instance, to an actuating device such as a lever or the like and the other end of the inner wire is connected to equipment to be controlled, such as a clutch unit or a brake unit.

In this configuration, the tension load applied to one end of the inner wire by the actuator is transmitted to the equipment to be controlled through the other end of the inner wire.

Nevertheless, when the inner wire comprises a wire strand and is repeatedly subjected to tension by heavy loads applied by the actuator to the equipment to be controlled, gradual permanent elongation of the wire occurs, which reduces the applied tension and does not allow accurate transmission of the actuating force.

Particularly, when the equipment to be controlled is, for instance, a clutch unit or a brake unit, the control cable has the flexible conduit mounted to two fixed ends and the inner wire, generally longer than the conduit, is attached at one end to the actuator and at the opposite end to the controlled equipment.

More in detail, said opposite end is connected to a movable member of the controlled equipment, which in turn transfers the actuating force to the equipment.

One example of a configuration as described above is shown in the annexed FIG. 1.

Referring to FIG. 1, the control cable, generally designated by numeral 1, comprises a conduit 2 and an inner wire 3 sliding within said conduit.

The conduit 2 is attached at its ends to two fixed abutments 4 and 5 located in the proximity of the actuator 6 and the equipment to be controlled 7 respectively.

However, the inner wire 3 is generally longer than the conduit 2 so that its two ends are exposed and may be attached at one end to the actuator 6, which is generally shown as a pedal 8, e.g. a clutch pedal, and at the opposite end to the movable member of the equipment to be controlled, which is generally shown as a lever 9 that engages and disengages a clutch unit.

Furthermore, the lever 9, which is subjected to the action of an elastic return member that tends to maintain the lever in the engaging position, causes the control cable to be preloaded and pretensioned.

Nevertheless, this configuration of use of the control cable has certain drawbacks.

Extensive use of equipment such as clutch units and brake devices causes gradual wear thereof, which results in a change of the size of friction members.

For example, in the example of FIG. 1, the change in the size of the clutch disk causes the disengaging position (or idle position) of the lever 9 to be displaced.

On the one hand this displacement of the lever 9 reduces the length of the exposed portion of the wire 3 between the fixed abutment 5 and the lever 9 and on the other it increases the length of the wire portion 3 between said abutment 5 and the actuator 6.

In other words, the elongation of the wire portion 3 between the abutment 5 and the actuator 6 generates some slack on the actuator 6, which results in a change in the useful actuation stroke and in the tension on the control cable.

A simple manner to obviate this problem, i.e. to restore the proper tension in the control cable, is to change the length of the conduit 2 between the two abutments.

More in detail, the conduit 2 is extended by a portion corresponding to the elongation of the inner wire 3 between the abutment 5 and the actuator 6.

Thus, the slack of the actuator 6 may be taken up, and the actuator will be able to operate with its full useful stroke.

Devices for adjusting the tension of a control cable as described above are already known.

These devices may be manual or automatic devices.

The former may be, for instance, screw mechanisms interposed between one of the two fixed abutments 4 or 5 and one of the ends of the conduit 2. These mechanisms essentially consist of adjustment screws of various shapes whose rotation changes their length between one end of the conduit 2 and one of the fixed abutments.

The devices so conformed substantially act as a movable appendix of the conduit 2 and simulate lengthening or shortening of the conduit.

With these devices, the work to take up the slack and restore proper tension in the cable must be done manually each time that the slack generated by the wear of the equipment starts to cause malfunctioning of the actuator, and hence such work is rather laborious.

Conversely, automatic devices interposed between the two fixed abutments 4, 5, as suggested by their name, can automatically change the actual length of the conduit 2 and restore proper tension in the control cable without requiring any manual action.

These devices generally include two sliding parts in mutual axial sliding relation, which have the wire 3 and means for allowing and preventing such mutual axial translation of the two parts inserted therein.

Devices with such configuration may be located in the proximity of one of the two fixed abutments 4 and 5, or between two portions of the conduit 2.

In both cases, a change in the relative position of the two parts of the device simulates a change in the total length of the conduit 2 between said fixed abutments 4 and 5.

In a known embodiment, these means that lock and unlock the relative translation of the two parts consist, for instance, of expansion members that internally or externally engage one of the two sliding parts.

More in detail, these expansion members and these sliding parts may be formed with mating shaped surfaces, to facilitate mutual engagement, i.e. locking of the two parts.

With the help of elastic elements operating on the two sliding parts, the device can have an automatic operation, i.e. gradually change its length according to the elongation of the portion of the wire 3, caused by the wear of the equipment to be controlled.

Nevertheless, automatic devices of this type suffer from certain operation drawbacks.

The specially shaped coupling surfaces as described above only allow discrete, non continuous translation of the two parts.

For example, if these surfaces consist of threaded elements, the translation of the parts may occur with steps corresponding to the thread pitch.

Also, due to the conformation of these specially shaped surfaces, these devices are prone to malfunctioning events caused by jamming of these coupling surfaces.

In this context, the object of the present invention is to provide a device for automatic adjustment of the tension applied to a control cable, that can obviate the above mentioned prior art drawbacks.

Particularly, the object of the invention is to provide a device for automatic adjustment of the tension applied to a control cable for controlling equipment such as clutch units or brake devices, that can take up slacks or loosening, caused by the wear of said equipment, in a continuous manner.

A further object of the present invention is to provide a device for automatic adjustment of the tension applied to a control cable, that is not prone to malfunctioning during operation.

The above objects are substantially fulfilled by a device for automatic adjustment of the tension applied to a control cable, that comprises the technical features as set out in one or more of the annexed claims.

Further features and advantages will result more clearly from the illustrative, non limiting description of a preferred embodiment that does not limit the invention, as shown in the annexed figures, in which.

Figure 1:
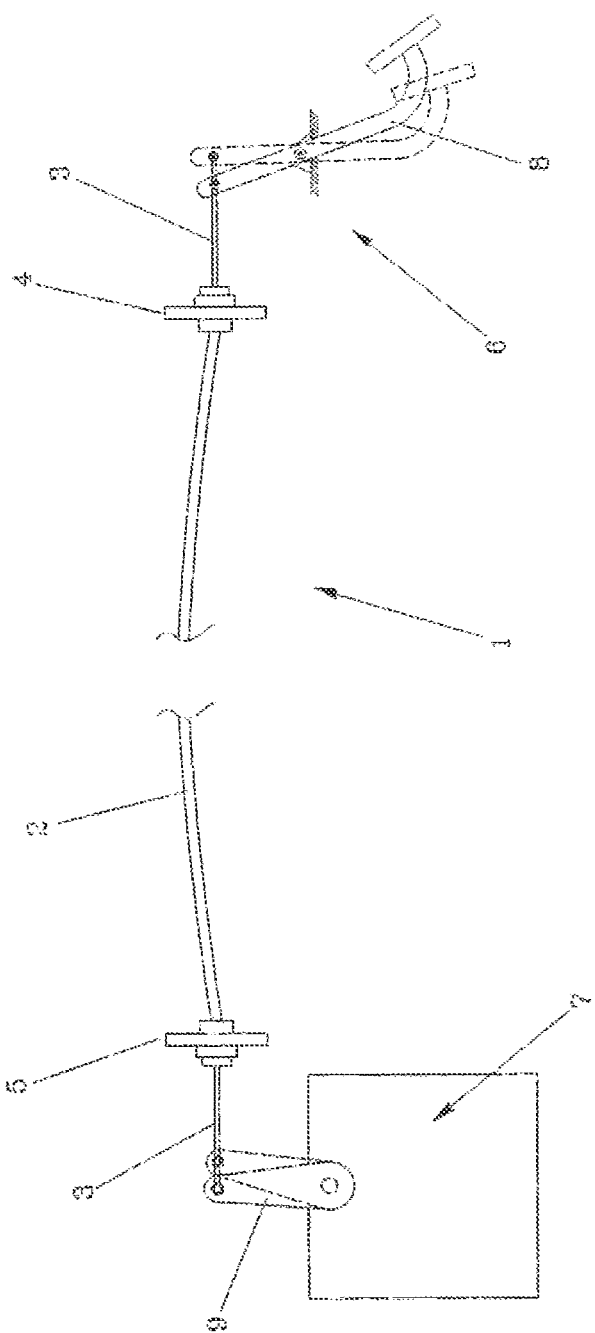
FIG. 1 is a diagrammatic view of a prior art mechanism.

Referring to the annexed figures, the device for automatic adjustment of tension applied to a control able, which is generally designated by numeral 10, may be located at one end of a conduit 12 of a control cable 11 or between two portions of said conduit 12.

A wire 13 is inserted in the device 10 and is allowed to freely slide therein.

Such device 10 generally comprises an outer shell 14 which is in turn composed of two facing half-shells 15 and 16, attached to each other by known locking means.

First and second sliding elements 17 and 18 are housed in said shell and are allowed axial translation relative to said shell 14.

More in detail, the half-shell 15 has a projecting portion 19, adapted to support the sliding element 17, partially inserted in said half-shell 15; said element 17 preferably consists of a hollow circular element such as a tube or the like.

More particularly, such tube 17 has a corrugation 32 on the outer surface, which is designed to mate with a corresponding corrugation formed on the inner surface of the projecting portion 19 of the half-shell 15, to guide translation of said tube 17 relative to the half-shell 15.

Likewise, the half-shell 16 has a projecting portion 20 for supporting the sliding element 18 and a conduit portion 12; namely, said sliding element 18 comprises a slider 21 which slides in said portion 20 of the half-shell 16, and a tube 22 attached to said slider 21, which is in turn partially inserted in the tube 17.

The tube 17 has a plurality of apertures 24 on its outer wall 23, in radial equally spaced arrangement with respect to the sliding axis, each of said aperture housing one ball 25 whose diameter is considerably greater than the thickness of the wall 23 of the tube 17, and which project therefrom both externally and internally.

Figure 3:
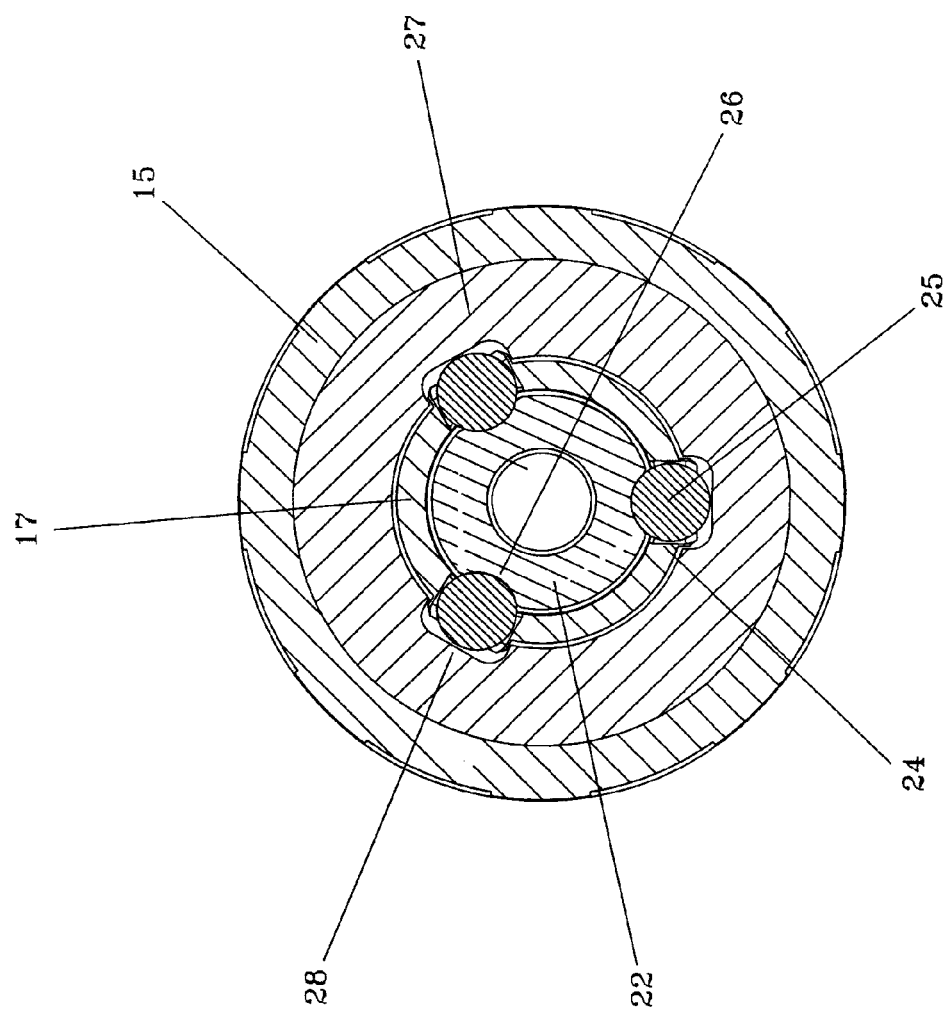
FIG. 3 is a cross sectional view of the device of FIG. 2 according to the invention.
Figure 4:
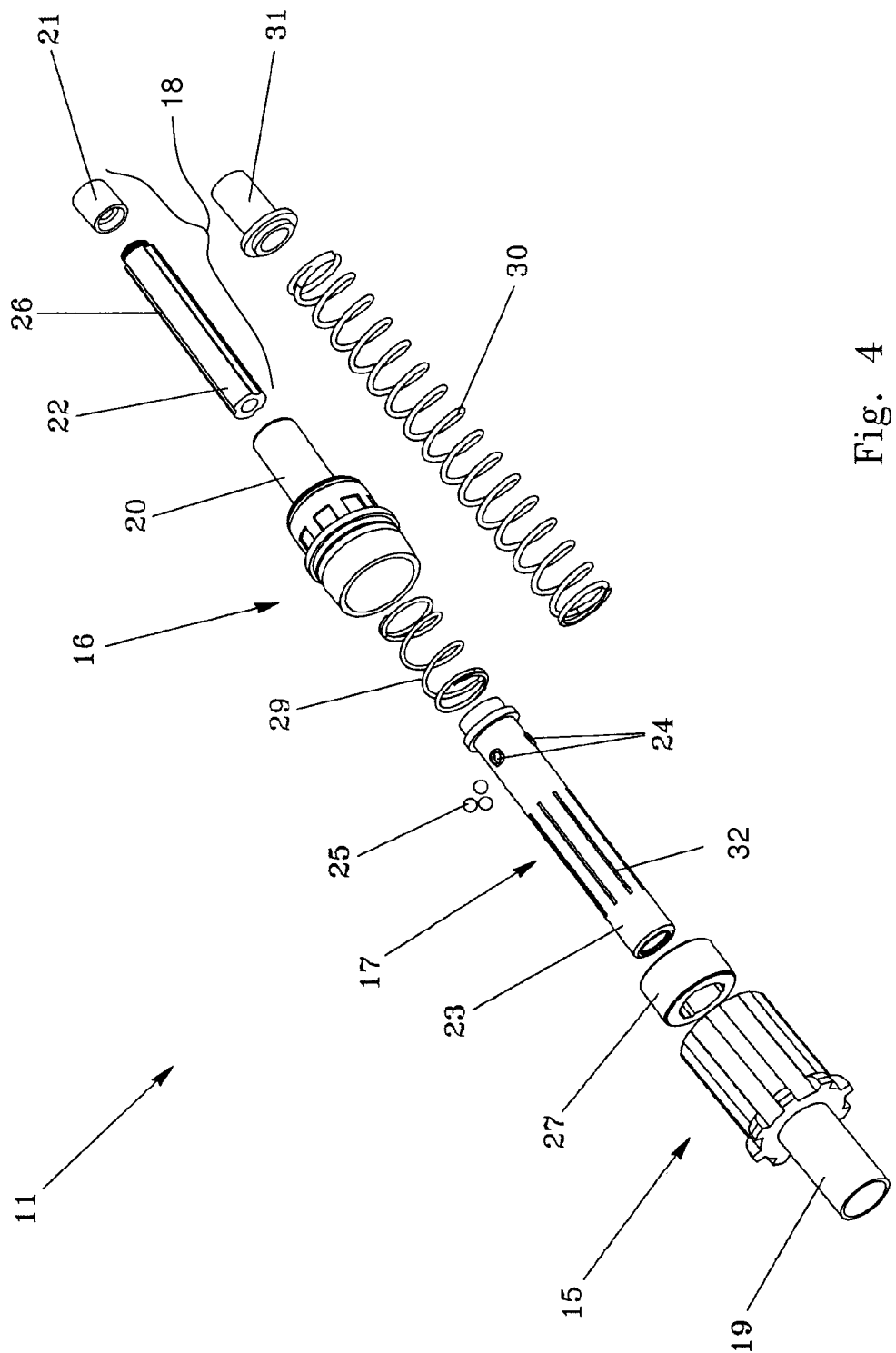
FIG. 4 is a perspective exploded view of the device of FIG. 2 according to the invention.

Preferably, according to the invention, the tube 17 has at least three apertures 24 in a 120° spaced arrangement, as shown in FIG. 3.

The tube 22 has a series of parallel longitudinal grooves 26 on its outer surface, which are as many as the apertures 24 of the tube 17.

These grooves have a semicircular profile, with a radius that is substantially identical to the radius of the ball 25 housed in each aperture 24.

The half-shell 15 also houses a bushing 27, whose inside diameter is slightly larger than the outside diameter of the tube 17, which is arranged around said tube 17 at the apertures 24.

A plurality of tracks 28 are formed on the inner surface of said bushing 27, and are inclined to the axis of translation of the elements 17 and 22.

More in detail, both these tracks 28 and the grooves 26 of the tube have a semicircular profile with a radius substantially identical to the radius of the balls 25 in the apertures 24 and are as many as the apertures 24 of the tube 17.

Figure 2:
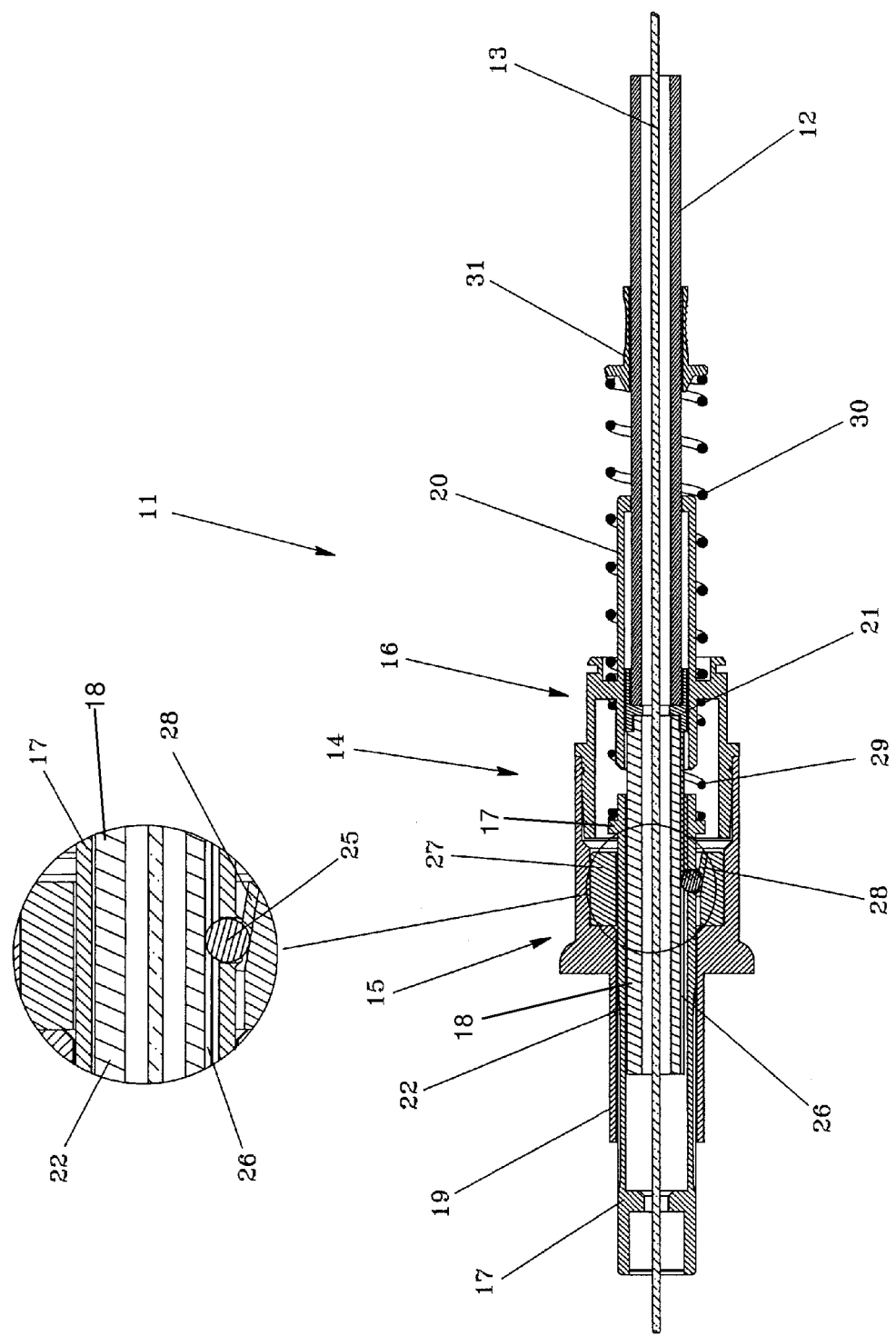
FIG. 2 is a longitudinal cross sectional view of a device for automatic adjustment of tension applied to a control cable of the invention.

The bushing 27 is mounted in the half-shell 15 so that the tracks 28 are in converging positions when run from right to left (referring to the arrangement of FIG. 2).

A first elastic element 29 is inserted in the shell 14; namely this elastic element 29, e.g. a helical spring, is interposed between the half-shell 16 and the tube 17 and exerts an elastic force on said tube 17 by pushing it to the left (referring to the arrangement of FIG. 2) into a device locking position.

This device locking position is better visible in the detail of FIG. 2.

A second elastic element 30, e.g. a helical spring, is interposed between an outer surface of the half-shell 16 and a plate 31 integrally attached to the conduit 12 which is in turn connected to the tube 22.

This elastic element 30 exerts an elastic force that tends to pull the conduit 12 and the tube 22 to the right (referring to the arrangement of FIG. 2) to an unlocking position.

When the control cable 11 is in an optimal operating state, with no slack or loosening, its operating configuration is as shown in FIG. 2.

In this configuration, the length of the wire 13 between the two fixed abutments 4 and 5 substantially coincides with the sum of the total lengths of the conduit/s 12 and the adjustment device 10.

Namely, in this configuration, the tube 17 is pushed to the left (referring to the arrangement of FIG. 2) by the elastic element 29 into a locking position.

This locking position is achieved due to the conformation of the inclined tracks 28 of the bushing 27.

In this position, the space between the seats 26 of the tube 22 and the tracks 28 is substantially equal to the diameter of the balls 25; no translation is thus allowed to the left of the tube 22, as this would also cause rotation of the balls 25 in the tube 17 toward an area in which the space between the seats 26 of the tube 22 and the tracks 28 would be smaller than the diameter of the balls 25.

Thus, the system ensures that tension is maintained in the control cable, and prevents any reduction of the total length of the conduit/s 12 and the adjustment device 10.

The elastic element 30 operating on the plate 31, that would tend to pull the conduit 12 to the right (referring to the arrangement of FIG. 2), will conversely create a preload on the cable, corresponding to the proper working tension, the length of the wire portion 13 between the two abutments 4 and 5, and the distance between such fixed abutments being unchanged.

Figure 5:
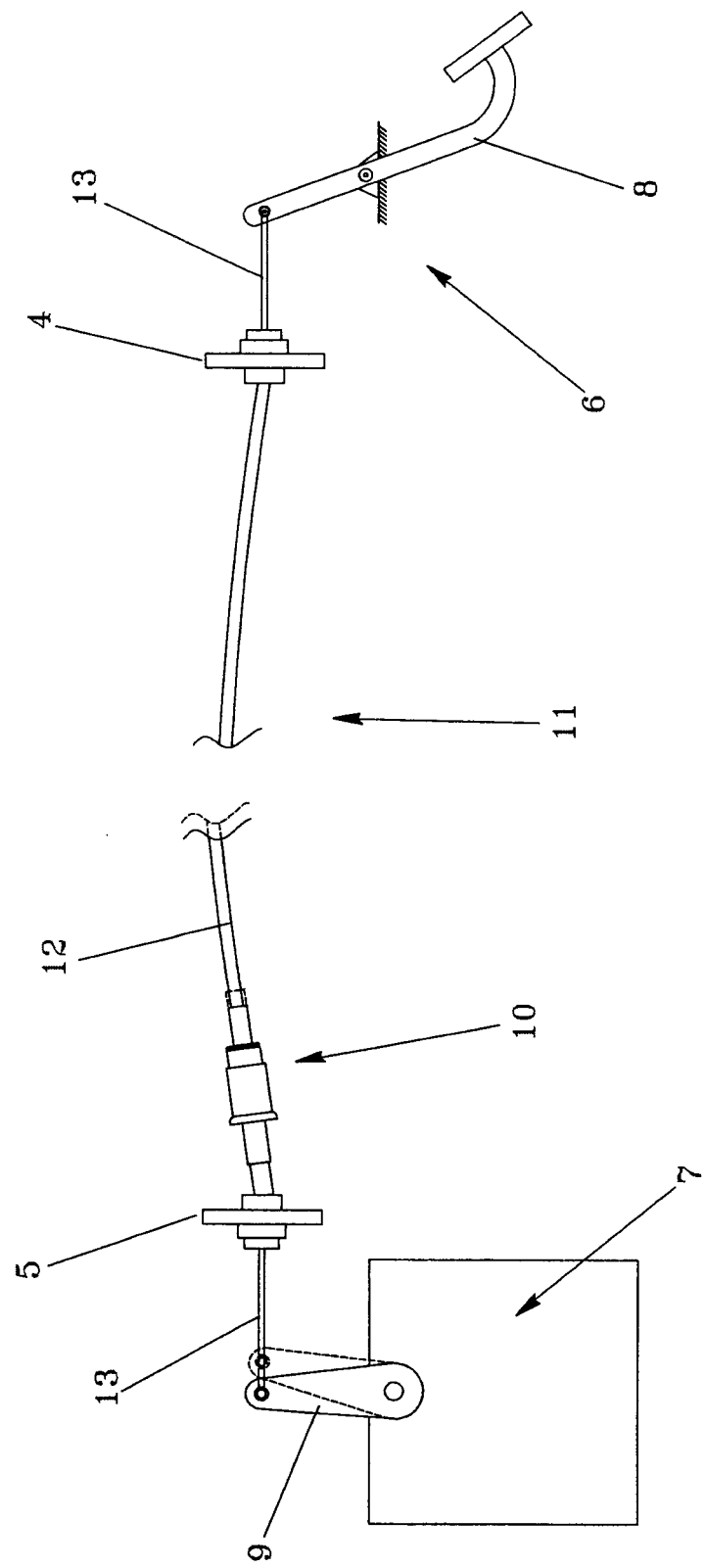
FIG. 5 is a diagrammatic view of an example of use of the device of FIG. 2, applied to a control cable.

Upon gradual wear of the device to be controlled, such as a clutch or the like, if the operating position of the actuating lever 9 changes (as shown in FIG. 5), the portion of the wire 13 between the two fixed abutments 4 and 5 increases its length, thereby changing the tension in the control cable.

In order to restore proper tension in said control cable, the device operates as described below.

Under these conditions, the length of the wire 13 between the two fixed abutments 4 and 5 is longer than the sum of the lengths of the conduit/s 12 and the adjustment device 10.

Here, the elastic element 30 which, as mentioned above, exerts an elastic force that tends to pull the conduit 12 and the tube 22 to the right (referring to the arrangement of FIG. 2) causes the conduit 12 and the tube 22 to actually translate to the right.

Then, the tube 22 is automatically unlocked because, as it moves to the right, it rotates the balls 25 to a position in which the space between the seats 26 of the tube 22 and the tracks 28 is larger than the diameter of these balls 25.

Therefore, the tube 22 slides to the right within the tube 17 and causes a portion of the conduit 12 substantially equal to the excess portion of the wire 13 between the two fixed abutments 4 and 5 to project out of the half-shell 16.

When the length of the wire 13 between the two fixed abutments 4 and 5 coincides again with the total lengths of the conduit/s 12 and the adjustment device 10, the tube 22 will stop and the elastic element 29 will move the balls back to the locking position.

Therefore, the present invention can solve prior art drawbacks and provide a device for automatic adjustment of tension applied to a control cable that can take up the slack and loosening in a continuous manner, for the cable to always operate with the proper working tension.

Furthermore, the device of the invention has a simple operation, that ensures reliability and prevents the frequent jamming events of prior art devices.

The device for automatic adjustment of tension applied to a control cable as disclosed above is susceptible to a number of changes and variants within the inventive concept; furthermore, all details thereof may be replaced by technical equivalents.

The invention claimed is:

1. A control cable arrangement comprising:
    a control cable (11) including a duct (12), a plate (31) integrally attached to the duct (12) and a wire (13) inserted in the duct (12); and
    a device (10) for the automatic adjustment of the tension applied to the control cable (11, 13), wherein the wire (13) is also inserted in the device (10), the device (10) comprising:
    a container element (14, 15, 16),
    a first sliding element (17), in the form of a tube, adapted to slide inside said container element (14),
    a second sliding element (18, 21, 22), in the form of a tube, adapted to slide inside said first sliding element (17) and connected at one end to the duct (12) housing said control cable (13), and
    means adapted to constrain the translation of said first and second sliding elements (17, 18) inside the container, wherein said means include at least one sphere (25) housed in a seating (24), in the form of an aperture, obtained in the first sliding element (17), said sphere presenting at least a lower portion in contact with said second sliding element (18) and at least an upper portion which contacts a track (28) formed inside said container (14), said track (28) being inclined to the axis of translation of said first (17) and second (18, 22) sliding elements,
    wherein there are provided first elastic means (29), in the form of a helical spring, operating on the first sliding element (17) in order to maintain the device in a lock position in which the sphere (25) gets in contact with said track (28) and second elastic means (30), in the form of a helical spring, operating on the second sliding element (18) in order to bring the device in an unlocked position in which said sphere (25) is not in contact with said track (28) formed in the container (14), with said second elastic means (30) being interposed between the container and the plate (31) attached to the duct (12),
    wherein when the cable tension is not being adjusted the device is in a resting state,
    wherein said second sliding element (22) has on its outer surface a longitudinal groove (26), for housing said lower portion of said sphere (25),
    wherein the wire (13) is allowed to freely slide within the device (10),
    wherein said first (29) and second (30) elastic means are configured such that, when the device is in the resting state, the device is in the lock position and the sphere (25) is held at its upper portion against the track (28) by the first elastic means (29), and
    wherein, upon gradual wear of the equipment (7) to be controlled and actuated by the control cable of the device and consequent change of the tension in the same control cable (13), the second elastic means (30) exerts an elastic force that tends to disengage the sphere (25) from said track (28) and thereby to unlock the second sliding element (22) and bring the device from the lock position to the unlock position,
    whereby, with the device in the unlock position, the second sliding element (22) slides within the first sliding element (17) so as to cause a portion of the duct (12) to project out of the container (14, 16) and in this way restore automatically proper tension in the control cable at any gradual wear of the equipment (7) to be controlled and actuated by the control cable (13) of the device.

2. The control cable arrangement according to claim 1, characterized in that it provides at least for two spheres (25).

3. The control cable arrangement according to claim 1, characterized in that it provides at least for three spheres (25).

4. The control cable arrangement according to claim 1, characterized in that said first sliding element (17) comprises a pipe (17) on whose exterior wall (23) is provided a plurality of holes (24) placed radially with reference to the sliding axis and spaced equidistantly apart, each hole housing a sphere (25).

5. The control cable arrangement according to claim 1, characterized in that said second sliding element (18) comprises a pipe (22) and a cursor (21) which serves as a link between said pipe and the duct (12) of the control cable (13).

6. The control cable arrangement according to claim 2, characterized in that said second sliding element (18) is shaped in order to provide in the contact area with the two spheres (25) the same number of longitudinal grooves (26) with radii substantially identical to the radii of the spheres (25).

7. The control cable arrangement according to claim 6, characterized in that said container (14) in the zone of contact with the spheres (25) is shaped in such a manner to define the same number of inclined tracks (28) so that in said unlocked position the space comprised between the longitudinal grooves (26) of the second sliding element (18) and said tracks (28) is bigger than the diameter of said spheres (25).

8. The control cable arrangement according to claim 1, characterized by the fact that said track (28) is obtained in an inner surface of a bushing (27) housed inside of said container (14).

9. The control cable arrangement according to claim 1, characterized by the fact that said first elastic means (29) is placed inside of said container (14) and placed between said first sliding element (17) and an inner wall of said container (14).

10. The control cable arrangement according to claim 1, characterized by the fact that said second elastic means (30) is placed between an outer wall of the container (14) and a plate (31) solidly mounted to the duct (12) of the control cable.

11. The control cable arrangement according to claim 1, characterized by the fact that said container is formed by a first half-shell (15) and by a second half-shell (16), said half-shells (15, 16) being one in front of the other and locked together axially.

12. The control cable arrangement according to claim 1, wherein said upper portion of the sphere (25) contacts at a point with a bottom side of said track (28) inclined to the axis of translation of said first (17) and second (18, 22) sliding elements.

* * * * *